H. B. SHERMAN.
SHELL INVERTING MECHANISM FOR DRAWING PRESSES.
APPLICATION FILED AUG. 6, 1917.
1,280,881.
Patented Oct. 8, 1918.
4 SHEETS—SHEET 1.
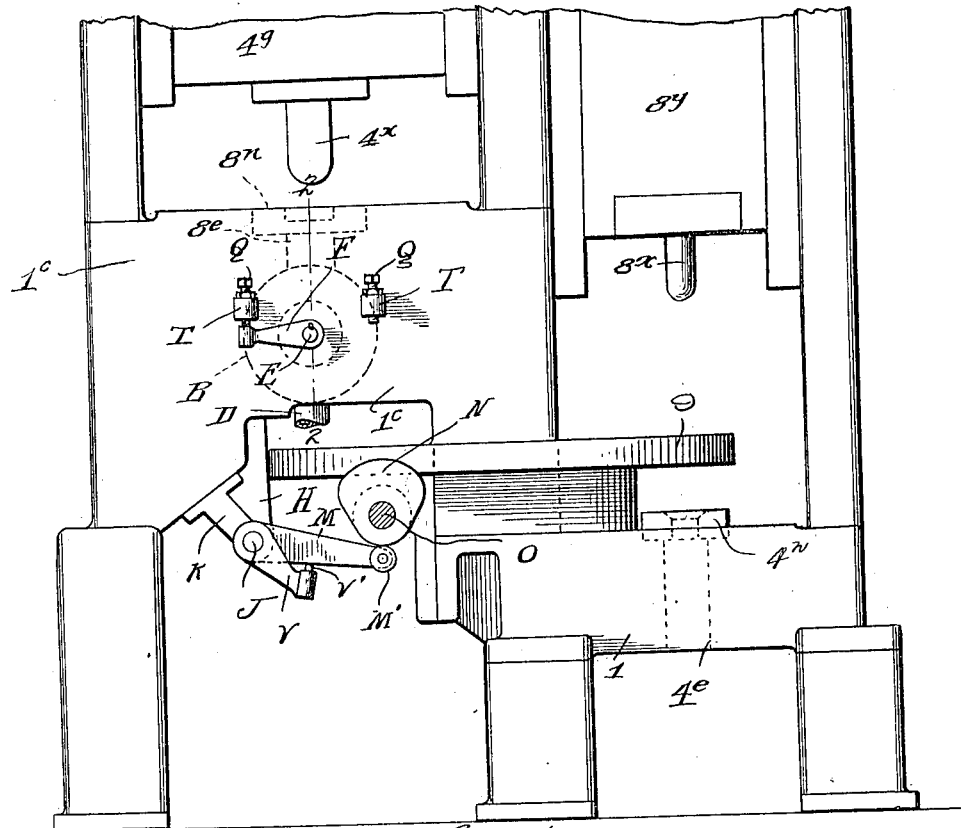
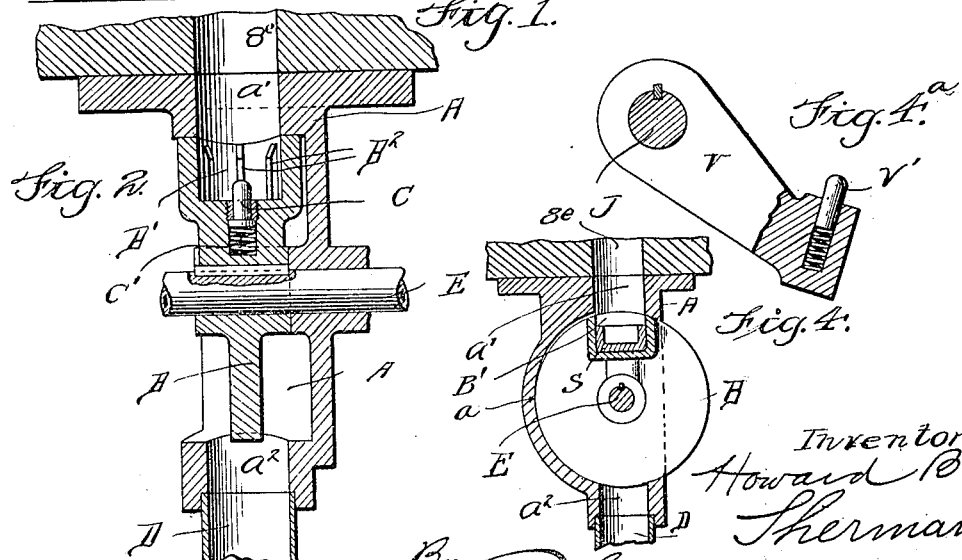
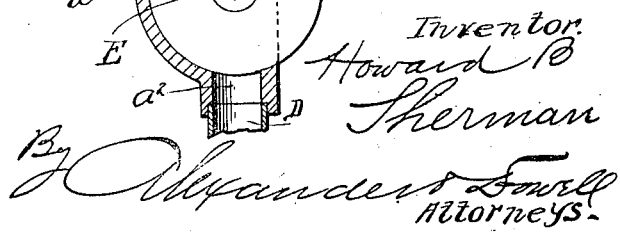
Inventor.
Howard B. Sherman
By Alexander & Dowell
Attorneys.

H. B. SHERMAN.
SHELL INVERTING MECHANISM FOR DRAWING PRESSES.
APPLICATION FILED AUG. 6, 1917.
1,280,881.
Patented Oct. 8, 1918.
4 SHEETS—SHEET 2.
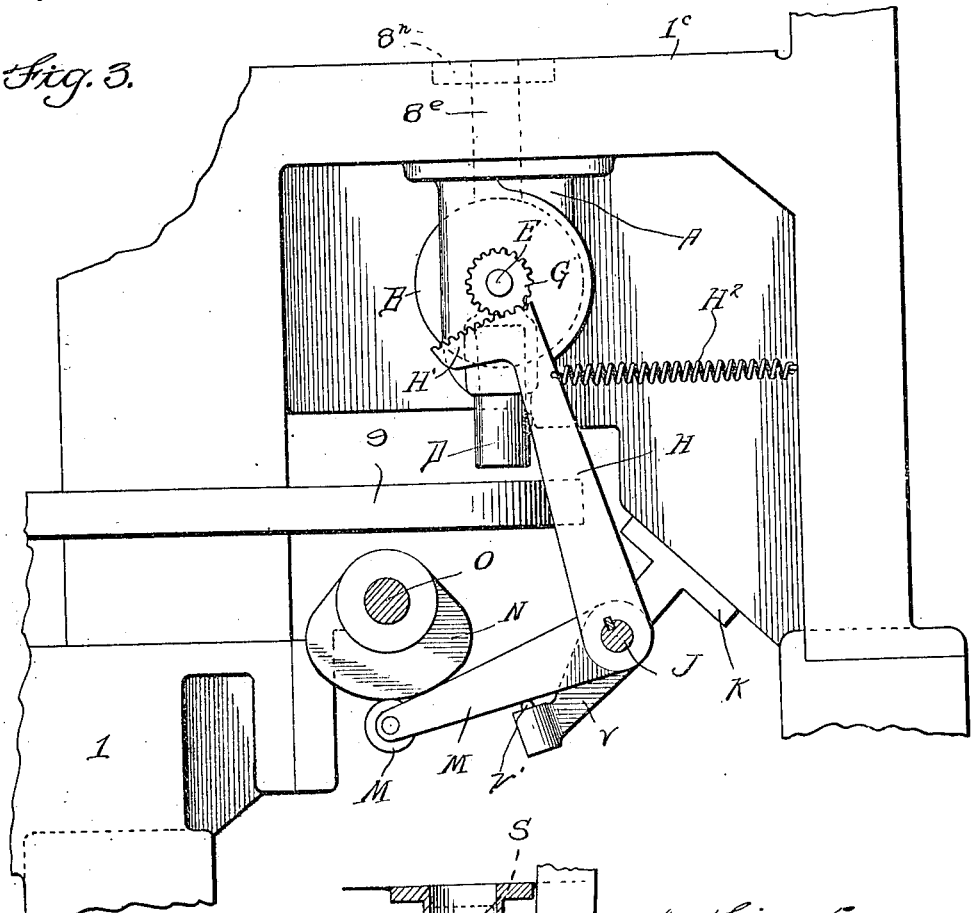
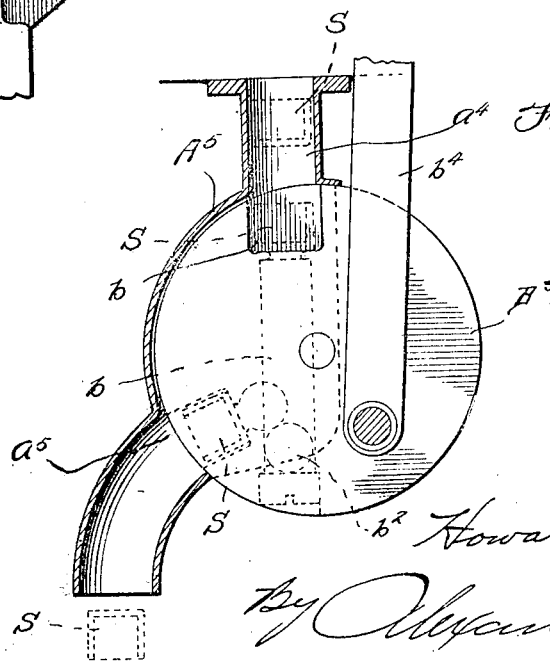
Inventor:
Howard B. Sherman
By Alexander & Dowell
Attorneys H. B. SHERMAN.
SHELL INVERTING MECHANISM FOR DRAWING PRESSES.
APPLICATION FILED AUG. 6, 1917.

1,280,881.

Patented Oct. 8, 1918.
4 SHEETS—SHEET 3.

Inventor
Howard B Sherman
By Alexander Dowell
Attorneys

H. B. SHERMAN.
SHELL INVERTING MECHANISM FOR DRAWING PRESSES.
APPLICATION FILED AUG. 6, 1917.
1,280,881.
Patented Oct. 8, 1918.
4 SHEETS—SHEET 4.
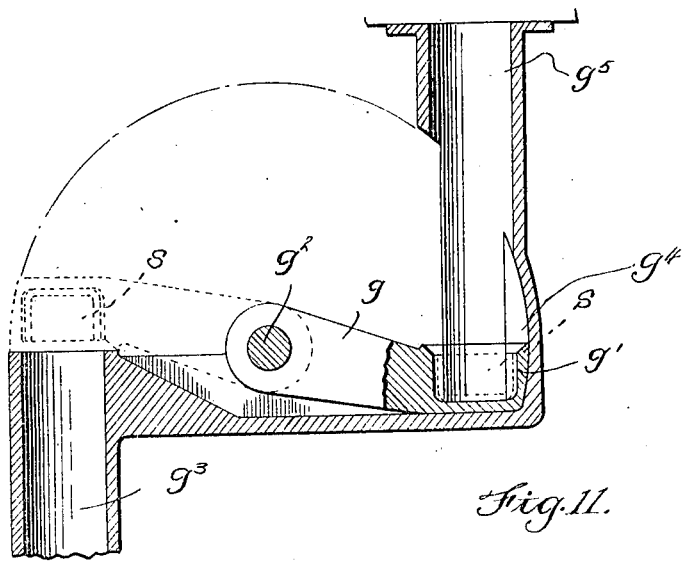
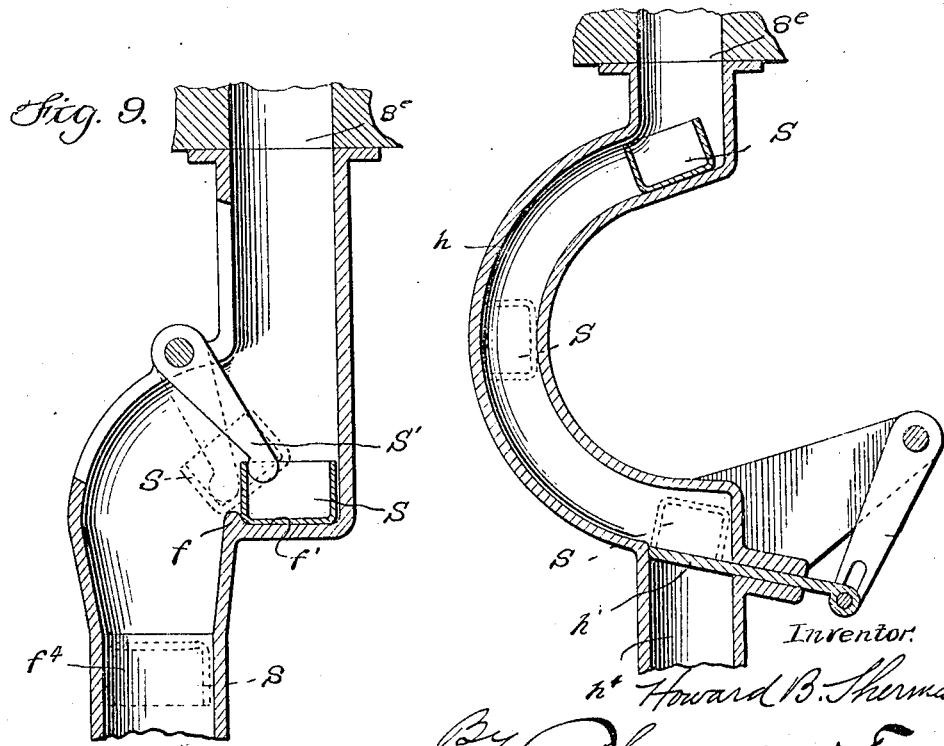
Inventor:
Howard B. Sherman
By Alexander & Dowell
Attorneys

UNITED STATES PATENT OFFICE.

HOWARD B. SHERMAN, OF BATTLE CREEK, MICHIGAN.

SHELL-INVERTING MECHANISM FOR DRAWING-PRESSES.

1,280,881.  Specification of Letters Patent.  Patented Oct. 8, 1918.

Application filed August 6, 1917. Serial No. 184,719.

*To all whom it may concern:*

Be it known that I, HOWARD B. SHERMAN, a citizen of the United States, residing at Battle Creek, in the county of Calhoun and State of Michigan, have invented certain new and useful Improvements in Shell-Inverting Mechanism for Drawing-Presses; and I hereby declare that the following is a full, clear, and exact description thereof, reference being had to the accompanying drawings, which form part of this specification.

This invention is an improvement in machines for stamping and drawing metal, such as shown in my Patents No. 1,117,097, dated November 10, 1914, and No. 1,136,558, dated April 20, 1915.

The object of the present invention is to provide novel means for reversing the position of the drawn shells or like objects after the same are drawn and before they are delivered to the carrier by which they are presented to other mechanism for further operation thereupon; and in particular so that if the shells are drawn with their closed ends downward they shall be delivered to the carrier with their closed ends uppermost. Such inversion of the shells is useful and important in the production of various drawn metal articles and enhances the field of work, or variety of work for which my said patented drawing machines may be used, or the number of operations which may be successfully performed on the objects in the machines.

I will explain the invention as applied to the said patented machines, but when understood those familiar with the art can readily apply it to other machines, and I do not consider it restricted to the particular type of machines shown in my said patents; and refer to the claims following the description for summaries of all essentials of the invention and the novel features and combinations of parts.

In said drawings:

Figure 1 is a partial front elevation of a press, such as shown in my Patent No. 1,117,097, with the invention applied thereto.

Fig. 2 is an enlarged detail sectional view on line 2—2 Fig. 1.

Fig. 3 is an enlarged front elevation of the parts of the shell inverting mechanism shown in Figs. 1 and 2 looking from the rear of Fig. 1.

Fig. 4 is a sectional view of Fig. 2.

Figure 6:
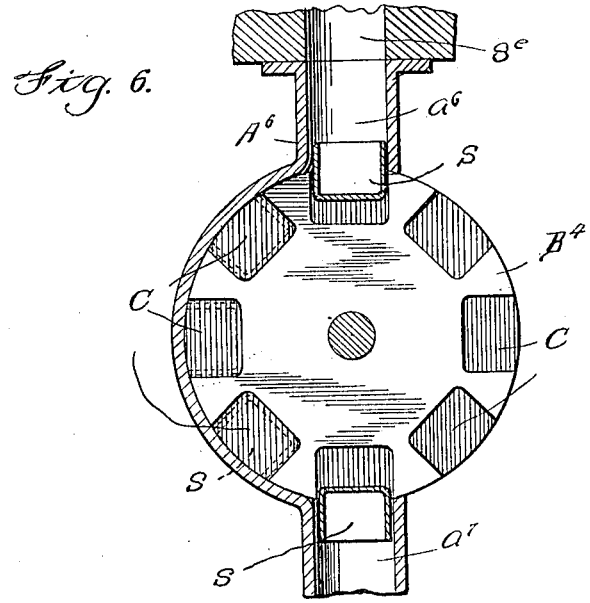

Fig. 4$^a$ is a detail.

Figs. 5, 6, 7, 8, 9, 10 and 11 are diagrammatic sectional views illustrating some of the possible modifications of the invention.

On the main frame of the machine shown in my aforesaid patent are mounted a double-acting draw press, or other operative mechanism, and a single acting draw press, or other operative mechanism, arranged side by side. For convenience I will hereinafter refer to these mechanisms as double-acting press and single-acting press, but such terms are merely illustrative of the invention, and not definitive thereof—and are intended to include any mechanisms with which the novel blank or object transferring mechanism or carrier could be usefully employed.

The double acting portion of the press has a bed 1, supporting a female die $4^n$ coacting with a male die $4^x$ on a slide $4^y$; and the single-acting portion of the press has a bed $1^c$ supporting a changeable female die $8^n$ coacting with a male die $8^x$ attached to a slide $8^y$. The construction of said slides and means for operating same are well known, and may be of any suitable kind. The die $8^n$ is arranged above an opening $8^e$ through which the drawn shells are dropped onto a suitable carrier 9, which in the example shown is rotatably mounted below bed $1^c$ and above bed 1, and is adapted to carry the shells received from die $8^e$ to and over a changeable die or dies $4^n$ mounted on bed 1 above an opening or openings $4^e$. This carrier may be operated in any suitable way, and may be of any suitable construction to carry shells from one bed or means for operating on the shells, to another bed or operating means.

In preferred form of the device shown in Figs. 1–3 a casting A is attached to the bed $1^c$ below opening $8^e$, said casting having a parti-cylindric chamber $a$ having an inlet $a'$ adapted to receive the shells from passage $8^e$, and an outlet $a^2$ adapted to discharge the shells onto the carrier 9 or into a pipe D by which the shells may be directed into a carrier or receiver. On chamber $a$ is mounted a disk B, which as shown has a peripheral socket B' adapted to be registered alternately with the inlet $a'$ and outlet $a^2$. When socket B' is uppermost, as shown in Figs. 2 and 4, it will receive a drawn shell S closed-end down from passage $8^e$, and when the disk is turned 180° the shell will be inverted and discharged with its closed end uppermost through the outlet $a^2$ onto the carrier 9.

The socket B' may be provided with ribs $B^2$ on its sides to properly center the shell therein and may be provided with any suitable means to eject the shell at the proper time, as shown an ejecting pin C is yieldingly confined in the bottom of the socket and may be projected by its weight, aided by a spring C' so as to eject the shell when the disk has been turned to bring the shell to the outlet $a^2$.

The disk B may be operated by any suitable means. As shown it is mounted on a stub shaft E journaled in bearings in the bracket A and in the side wall of the bed $1^c$; and on this shaft E is keyed a pinion $g$ which meshes with a segmental rack H' on a lever H which is attached to a rock-shaft J, mounted in suitable bearings, and as shown in a bracket K attached to the bed or press frame below the shaft E. On this shaft J is also keyed an arm V which has a spring projected bolt V' on its outer end bearing against the under side of a lever M loosely mounted on shaft J.

The lever M is loosely mounted on shaft J and carries a roller M' bearing against a cam N on the shaft O (operated by gearing not shown) that actuates the mechanism (not shown) by which carrier 9 is rotated, so that for each step imparted to the carrier the lever M will be rocked once back and forth and consequently through rack H' will impart an oscillatory motion to the shaft E sufficient to turn the disk B back and forth through an arc of approximately 180 degrees. The lever H may be rocked by spring means in opposition to the cam N and so as to hold lever M normally against said cam, a spring $H^2$ being shown in Fig. 3, attached to cam N, spring $H^2$, lever H and to a suitable point on the frame.

On the shaft E is keyed an arm F which is adapted to alternately contact with stop bolts Q and Q' which are adjustably mounted in studs T T' attached to the bed $1^c$ at opposite sides of the shaft E, as shown in Fig. 1. Said stops are provided so as to permit cam N to impart a slightly longer stroke to lever M than is necessary to turn the disk B a half revolution. When arm F comes into contact with either stop Q or Q' it arrests the movement of the disk B, the spring V' permitting the extra movement imparted to lever M by cam N when the arm F is engaged with stop Q'.

In operation shaft O is revolved by gearing forming part of the press mechanism (not shown) and cam N being keyed to this shaft revolves with it. The roller M' on the end of lever M is held in contact with cam N by the action of spring $H^2$ and bolt V', and as lever M is depressed by cam N, the quadrant H' is oscillated in such a manner as to revolve the pinion G through an arc of 180 degrees, and this pinion being keyed to this shaft E, disk B is also revolved through the same arc, thus bringing the pocket B in the disk alternately to top and bottom positions; and if a shell was deposited in the pocket when in the position shown in Fig. 2 it would be inverted or reversed and fall by gravity, assisted by the spring plunger C when brought opposite the outlet passage $a^2$, see Fig. 4.

The stops Q can be adjusted to compensate for wear and also to insure accurate alinement of the pocket B' in the disk with the intake and discharge openings $a'$ $a^2$, as by adjusting the stops Q and Q' the proper register of the pocket in disk B with the intake and discharge openings $a'$ $a^2$ can be positively assured.

A shell after being stripped from the die $8^n$ is free to fall through opening $a'$ into the pocket in the disk, the open end of shell being uppermost (see Fig. 2). The disk is then turned over until the pocket registers with the discharge opening $a^2$ (see Fig. 4), at which time the shell is in an inverted position, with open end downward, and in this position the shell drops into the carrier underneath.

The essential feature of the present invention is the provision of means for the inversion of the shell after it has been drawn by one mechanism or operated upon before it is delivered to the carrier or another mechanism and the devices shown in Figs. 1 to $4^a$ are at this time preferred.

The invention may be embodied in various mechanical forms and I have illustrated ous such forms in the drawings without intending to limit the invention thereby or thereto.

In the device shown in Fig. 5 the bracket $A^5$ has a pocket $a^5$ in which is mounted a disk $B^3$, said pocket having an inlet $a^4$ and outlet $a^5$. The disk $B^3$ has a pocket $b$ below which is a long cavity $b'$ in which a ball $b^2$ is loosely confined. After a shell S has dropped into the pocket $b$, through inlet $a^4$, the disk is revolved through a portion of a revolution until the pocket is in register with the outlet $a^5$. At this angle the ball $b^2$ which has been resting in the bottom of the cavity $b'$ will descend by gravity and eject the shell. The disk $B^3$ may be operated by any suitable means; as by a pitman rod $b^4$ connected with any suitable operative part of the machine not shown.

Fig. 6 the bracket $A^6$ has a recess in which is a disk $B^4$ provided with a series of pockets $c$ adapted to successively register with inlet $a^6$ and invert the shells S as they pass from the inlet to the outlet $a^7$. This disk $B^4$ may be operated step by step by any suitable intermittent ratchet gear or similar mechanism, not shown.

Figure 7:
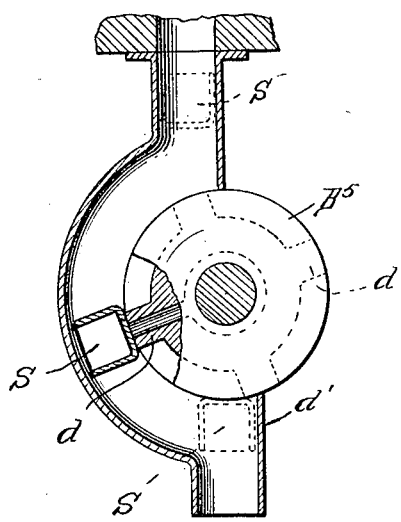

Fig. 7 shows a disk $B^5$ with a plurality of magnetized contact points $d$ on its periphery, each adapted to retain a shell S by magnetic attraction. This disk is revolved by any suitable means not shown, and carries the shells successively from the inlet to the discharge; the shells being stripped off at the discharge by contact with the wall or stop $d'$; this construction could only be used for shells made of magnetizable material.

Figure 8:
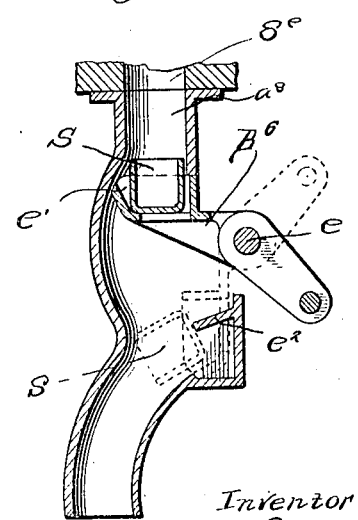

Fig. 8 shows a lever $B^6$ pivoted at $e$ in the side of the bracket below the inlet $a^8$ and provided with a pocket $e'$ on its inner end adapted to receive the shells. Below the lever $B^6$ is an inwardly projecting finger $e^2$ adapted to enter the pocket through a slot in the bottom thereof when the lever is lowered and eject the shell therefrom, as indicated in dotted lines. This lever $B^6$ may be oscillated by any suitable means (not shown) from the receiving position shown in full lines, to the discharging position shown in dotted lines, and the shell is ejected from pocket $e'$ and turned over by finger $e^2$ entering through the bottom of pocket as the lever descends.

In the construction shown in Fig. 9 the shell falls by gravity from passage $8^e$ into a small pocket $f'$ and is tipped out of said pocket over a rib $f$ into the outlet $f^4$ by means of a trip finger $S'$ which is revolved by any suitable mechanical means, not shown, and engages the open end of the shell S in pocket $f^6$ and turns it over into the discharge as indicated in dotted lines.

In Fig. 10 an arm $g$ having a pocket $g'$ on its end is mounted on a rock shaft $g^2$ adjacent the passage $8^e$ and in normal position the arm lies within a pocket $g^4$ in position to receive a shell dropping through the inlet $g^5$ from passage $8^e$, and the arm can then be rocked to the position shown in dotted lines, so as to invert the shell and discharge it mouth downward through the outlet opening $g^3$.

Fig. 11 shows a gravity tube $h$ into which the shells are delivered from passage $8^e$, the tube being curved so that the shells are turned over in their descent due to the shape of the tube. A slide valve $h'$ is arranged at the lower end of the tube and can be mechanically withdrawn at proper times by an actuating lever $h^2$ operated by any suitable means, not shown, so as to permit the inverted shell to fall into the outlet $h^4$.

In each of the constructions shown it will be observed that the shell or object will be inverted between the upper operating mechanism, and the carrier or lower operating mechanism.

I claim:

1. In a drawing press the combination of successive drawing mechanisms, means for directing the blank from one mechanism to the other, and means for inverting the blank in its passage from one mechanism to another.

2. In a drawing press the combination of an upper drawing mechanism and a lower drawing mechanism and means for inverting the object being operated upon in its passage from one operating means to the other.

3. In a drawing press the combination of an upper drawing mechanism and a lower drawing mechanism at one side thereof; with means interposed between said mechanisms for inverting the shell or blank being operated upon in its passage from the upper to the lower mechanism.

4. In a drawing press the combination of successive drawing mechanisms, a carrier for conveying shells or blanks from one mechanism to the other, and means for inverting the blank in passing from the first mechanism to the carrier.

5. In a drawing press the combination of drawing mechanism, a carrier for conveying shells or blanks delivered from such mechanism, and means for inverting the blank discharged from the mechanism before delivery to the carrier.

6. In a drawing press the combination of upper and lower drawing mechanisms, a carrier for conveying shells or blanks discharged from the upper mechanism to the lower mechanism, and means for inverting the blank discharged from the upper mechanism before its delivery to the carrier.

7. Means for inverting shells or blanks comprising an oscillatory member having a pocket and means for oscillating said member so as to register the pocket alternately with inlet and outlet points, and means for insuring registering of the pocket with the inlet and outlet points.

8. Means for inverting shells or blanks comprising an oscillatory member, means for rocking said member back and forth so as to register the pocket alternately with the inlet and outlet points, and adjustable stops for insuring registering of the pocket with the inlet and outlet points.

9. Means for inverting shells or blanks comprising an oscillatory member having a pocket, means for moving said member so as to register the pocket alternately with inlet and outlet points, means for insuring registering of the pocket with the inlet and outlet points, and means for ejecting blanks from the pocket in said member, substantially as described.

10. Means for inverting shells or blanks comprising a member having a pocket, a rock-shaft for operating this member, a pinion on said shaft, a segment meshing with said pinion, a spring pressed lever for operating said segment, a cam engaging said lever, and a second lever having a spring member yieldingly transmitting motion from the cam to the segment.

11. Means for inverting shells or blanks, comprising a member, a rock-shaft for operating this member, a pinion on said shaft, a segment meshing with said pinion, a spring pressed lever for operating said segment and a cam engaging said lever, an arm on said rock-shaft and adjustable stops adapted to be engaged by said arm to limit the movement of said member.

12. Means for inverting shells and the like, comprising a member having a pocket, a rock-shaft for operating this member, a pinion on said shaft, a segment meshing with said pinion, a spring pressed lever for operating said segment, a cam engaging said lever, and a second lever having a spring member yieldingly transmitting motion from the cam to the segment with an arm on said rock-shaft, and adjustable stops adapted to be engaged by said arm to insure registration of the pocket in said member with the inlet and outlet points.

In testimony that I claim the foregoing as my own, I affix my signature.

HOWARD B. SHERMAN.

Copies of this patent may be obtained for five cents each, by addressing the "Commissioner of Patents, Washington, D. C."